Jan. 18, 1938.  C. J. GREENBLATT  2,105,690
EFFERVESCENT TABLET
Filed June 1, 1935
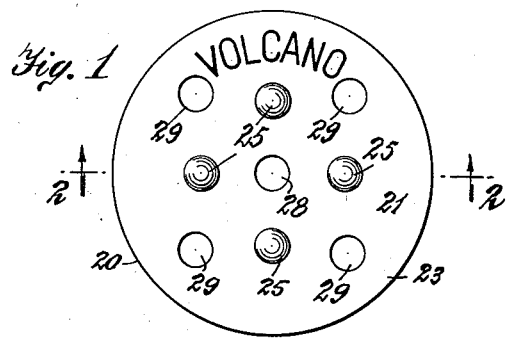
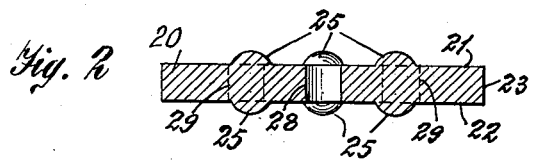
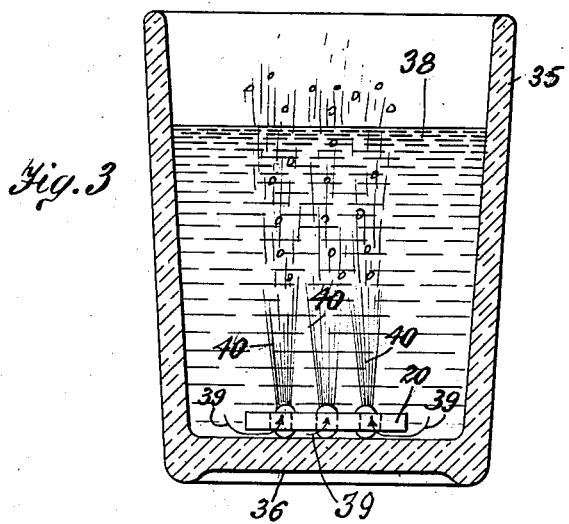
INVENTOR.
CARL J. GREENBLATT
BY A. A. de Bonneville
ATTORNEY.

Patented Jan. 18, 1938

2,105,690

UNITED STATES PATENT OFFICE 2,105,690

EFFERVESCENT TABLET

Carl J. Greenblatt, Bayonne, N. J.

Application June 1, 1935, Serial No. 24,484

4 Claims. (Cl. 99—78)

This invention relates to an effervescent tablet, and the method of making the same.

The essential object of the invention is the production of a non-medicated beverage tablet, which when dropped into a container or glass of water or other fluid, will be positioned with its flat faces spaced from the bottom wall of the said container or glass.

The second object of the invention is the production of a non-medicated beverage tablet constructed so that it will easily and quickly effervesce when dropped in water or other fluid.

The third object of the invention is the production of a tablet, medicated or non-medicated, adapted to effervesce when placed in a fluid, and having a contour shaped to space the major portion of the body of the tablet from the walls of the container in which it is placed to effervesce.

In the accompanying drawing Fig. 1 represents an enlarged top view of the non-medicated beverage tablet; Fig. 2 indicates a section of Fig. 1 on the line 2.2; and Fig. 3 shows a section of a drinking glass with water and a front view of the tablet therein.

The non-medicated beverage tablet is designated in its entirety by the numeral 20 and comprises the disc having the top flat face 21 and the parallel bottom face 22, connected by the cylindrical edge 23. Semispherical projections 25 are integral with and extend from the faces 21 and 22. The axial centers of the said projections are disposed in a circle having its axis in the axial center of the tablet. A circulating opening 28 extends through the tablet at its axial center and circulating openings 29 also extend through the tablet. The latter openings have their axial centers disposed in a circle having its axis in the axial center of the tablet. The openings 29 are positioned to straddle the projections 25. A legend, in this instance the word "Volcano" extends up from the face 21.

In Fig. 3 a drinking glass 35 is indicated with its bottom wall 36, and the tablet 20 is shown positioned upon the bottom wall 36. Water or other fluid in glass is indicated at 38. The arrows 39 show the direction of the flow of currents of the water circulating under and through openings 28 and 29 of the tablet, and 40 shows effervescent streams ascending from the tablet through the water 38.

To make the tablet about 55 grains of powdered confectioners' sugar is added to about 55 grains of powdered soda or potassium bicarbonate. To the mixture about one half grain in each case of powdered certified vegetable ingredients of various colors and which are pure food products, such as Concordine grape, blue in color, lemon, yellow in color, raspberry, red in color, and the like, are added to the mixture to give the tablet a predetermined color, to indicate the flavor of the tablet. If the tablet is to have a cherry or strawberry flavor the vegetable ingredient will be red in color. It the tablet is to have a grape flavor, the vegetable ingredient will be purple or blue in color. If the tablet is to have a lemon flavor, the coloring ingredient will be yellow and other coloring vegetable ingredients of various other colors may be employed for tablets of different flavors.

The above mixture I will herein designate as compound No. 1.

A second compound is produced with about 55 grains of powdered confectioners' sugar, or enough to produce the desired sweetness, about five grains of powdered fruit flavor, as natural dried strawberry or raspberry, etc. or natural fruit oils, such as lemon, orange, etc., of such quantity as will produce the desired taste. About 45 grains of either powdered citric acid, tartaric or 10 grains of phosphoric acid are then added. This latter mixture I will designate as compound No. 2. The said compound No. 2 is moistened with a small quantity of water and triturated.

Compound No. 1 is then gradually added to compound No. 2, until the two powders are thoroughly mixed.

The mixture of the two compounds are then placed in a dryer, the heat of which does not exceed 130 degrees Fahr. When the moisture has been sufficiently removed, the powder is charged into a tablet making machine.

The latter is located in an air conditioned room free from moisture. The heated moisture of the mixture of the two compounds, and the pressure to which it is subjected in the machine will bind the particles of the mixture to produce the tablet of the desired shape and size without the aid of gums or artificial binders.

The tablets after being discharged from the tablet making machine are preferably wrapped in waxed paper and placed in a moistureproof container or in wrapper of Cellophane.

When the tablets are used they are dropped into a drinking glass 35 full of water or other fluid and then will be automatically positioned to effervesce and dissolve. The bottom face 22 of the tablet will be spaced from the wall 36 of the drinking glass, and the water will cause the tablet to quickly effervesce and streams 40 of effervescent particles of the tablet will rise and simultaneously the water or other fluid will be drawn in currents 39 through the openings 28 and 29. With the water or other fluid contacting with all portions of the tablet and flowing through its openings, the said tablet will quickly effervesce and dissolve to produce the drink, from the medicated or non-medicated tablet.

Various modifications may be made in the invention and the present exemplification is to be taken as illustrative and not limitative thereof.

Having described my invention, I claim:

1. An effervescent tablet comprising a disc, having flat top and bottom faces parallel to each other, each of said faces having projections extending therefrom, said disc having an opening extending through its axial center and having other openings extending therethrough, said tablet adapted to be dropped into a fluid and thereby automatically positioned to effervesce and dissolve, the openings in the tablet functioning as passages for the fluid to flow therethrough.

2. An effervescent tablet comprising a disc having flat top and bottom faces parallel to each other connected by a cylindrical edge, each of said faces having semi-cylindrical projections extending therefrom, the axial centers of said projections disposed in a circle having its axis coaxial with axis of the disc, said disc having a circulating opening extending through its axial center and having openings extending therethrough with their axis disposed in a circle having its axis coaxial with the axis of the disc, said tablet adapted to be dropped into a fluid and thereby automatically positioned for its complete effervescence.

3. A tablet comprising ingredients of a color indicating its flavor and which will effervesce when placed in water or other suitable fluids consisting in a disc having flat top and bottom faces, said faces having projections extending therefrom and having a circulating opening extending through its axis, said disc having a plurality of other openings extending therethrough, the latter openings straddling said projections.

4. A non-medicated effervescent disc shaped tablet having top and bottom faces, each of said faces having projections extending therefrom, said disc having circulating openings extending therethrough, said tablet shaped when dropped into a fluid positioned for the flow of the fluid through its circulating openings.

CARL J. GREENBLATT.